United States Patent [19]
Chen et al.

[11] Patent Number: 5,807,945
[45] Date of Patent: Sep. 15, 1998

[54] (CO)POLYMERS BASED ON VINYL UNITS AND USE THEREOF IN ELECTROLUMINESCENT ARRANGEMENTS

[75] Inventors: Yun Chen; Rolf Wehrmann, both of Krefeld; Andreas Elschner, Mülheim; Ralf Dujardin, Willich, all of Germany

[73] Assignee: Bayer AG, Leverkusen, Germany

[21] Appl. No.: 716,727

[22] Filed: Sep. 23, 1996

[30] Foreign Application Priority Data

Oct. 2, 1995 [DE] Germany ............ 195 36 843.6

[51] Int. Cl.$^6$ ............ C08F 30/08; C08F 26/06; C08F 24/00; C08F 28/06
[52] U.S. Cl. ............ 526/279; 526/259; 526/268; 526/260; 526/256
[58] Field of Search .......... 526/279, 259, 526/260, 268, 256

[56] References Cited

U.S. PATENT DOCUMENTS

| | | | |
|---|---|---|---|
| 3,330,834 | 7/1967 | Senshu | 260/281 |
| 3,408,338 | 10/1968 | Szita et al. | 260/79.3 |
| 3,821,383 | 6/1974 | Sestanj et al. | 424/258 |
| 4,254,109 | 3/1981 | Sestanj | 424/178 |
| 4,539,507 | 9/1985 | Vanslyke et al. | 313/504 |
| 4,598,081 | 7/1986 | Efimov et al. | 514/296 |
| 4,720,432 | 1/1988 | Vanslyke et al. | 428/457 |
| 4,769,262 | 9/1988 | Ferrar et al. | 428/35 |
| 4,769,292 | 9/1988 | Tang et al. | 428/690 |
| 5,077,142 | 12/1991 | Sakon et al. | 428/690 |
| 5,235,045 | 8/1993 | Lewis et al. | 534/560 |
| 5,286,803 | 2/1994 | Lindsay et al. | 525/329.7 |
| 5,384,378 | 1/1995 | Etzbach et al. | 526/256 |
| 5,414,069 | 5/1995 | Cumming et al. | 528/310 |
| 5,420,136 | 5/1995 | Lewis et al. | 514/296 |
| 5,587,444 | 12/1996 | Uchida et al. | 526/247 |

FOREIGN PATENT DOCUMENTS

| | | |
|---|---|---|
| 0 206 322 | 12/1986 | European Pat. Off. . |
| 0 294 061 | 12/1988 | European Pat. Off. . |
| 0 387 715 | 9/1990 | European Pat. Off. . |
| 0 406 762 | 1/1991 | European Pat. Off. . |
| 0 443 861 | 8/1991 | European Pat. Off. . |
| 0 532 798 | 3/1993 | European Pat. Off. . |
| 0 564 224 | 10/1993 | European Pat. Off. . |
| 0 686 662 | 12/1995 | European Pat. Off. . |
| 0 728 775 | 8/1996 | European Pat. Off. . |
| 23 60 705 | 6/1975 | Germany . |
| WO 90/13148 | 11/1990 | WIPO . |
| WO 92/03490 | 3/1992 | WIPO . |
| WO 92/03491 | 3/1992 | WIPO . |
| WO 92/16023 | 9/1992 | WIPO . |

OTHER PUBLICATIONS

Tokito et al., Polyarylenevinylene films prepared from precursor polymers soluble in organic solvents, Polymer, vol. 31, pp. 1137–1141, Jun,. 1990.

Burn et al., Synthesis of a Segmented Conjugated Polymer Chain Giving a Blue–shifted Electroluminescence and Improved Efficiency, J. Chem. Soc., Chem. Comm., pp. 32–34, 1992.

von Seggern et al., Synthesis and structure–property relations of polymers for light emitting diodes based on isolated chromophore units, Macromol. Chem. Phys., vol. 195, pp. 2023–2037, 1994.

Grem et al., Realization of a Blue–Light Emitting Device using Poly(p–phenylene), Advanced Materials, vol. 4, No. 1, pp. 36–37, 1992.

Colaneri et al., Photoexcited states in poly (p–phenylene vinylene): Comparison with trans, trans–distyrylbenzene, a model oligomer, Physical Review B, vol. 42, No. 18, pp. 11 670–11 681 (Dec. 15, 1990).

P. Halliday et al., A Study on the Elimination Reaction of Sulfonium Polyelectrolyte Precursor Polymers to Poly(p–phenylenevinylene), J. Chem. Soc., Chem. Commun., pp. 1685–1687 (1992).

(List continued on next page.)

*Primary Examiner*—Joseph L. Schofer
*Assistant Examiner*—Wu C. Cheng
*Attorney, Agent, or Firm*—Connolly & Hutz

[57] ABSTRACT

This invention relates to (co)polymers which contain at least one repeat chain unit of the general formula (1) or (2) and optionally repeat units of the general formula (3),

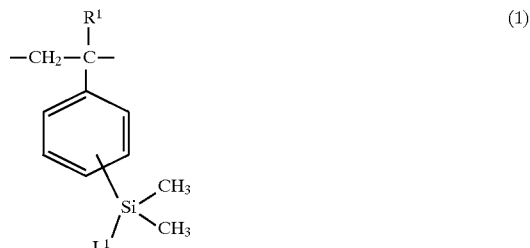

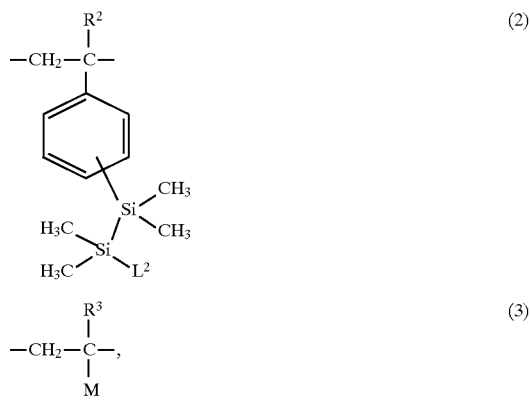

in which
  $L^1$ and $L^2$ denote a photoluminescent residue,
  wherein the proportion of structural units of the formulae (1) and/or (2) is in each case 0.5 to 100 mol. % and of (3) is 0 to 99.5 mol. % and the molar percentages add up to 100,
to the use thereof for the production of electroluminescent arrangements and to the electroluminescent arrangements.

20 Claims, No Drawings

OTHER PUBLICATIONS

G.E. Johnson et al., Electroluminescence from single layer molecularly doped polymer films, Pure & Appl. Chem., vol. 67, No. 1, pp. 175–182, (1995).

Kido et al., Single–layer white light–emitting organic electroluminescent devices based on dye–dispersed poly(N–vinylcarbazole), Appl. Phys. Lett. 67 (16), pp. 2281–2283 (Oct. 16, 1995).

Pommerehne et al., Efficient Two Layer LEDs on a Polymer Blend Basis, Advanced Materials, (1995), 7, No. 6, pp. 551–554.

Chem. Abstr. 116:372 210725e (1992).

Chem. Abstr. 99:662 22909z (1983).

Chem. Abstr. 117:647 35794y (1992).

Chem. Abstr. 81:120 154514e (1974).

Kim et al., Synthesis and Fluorescence Behavior of Poly [ω–(1,8–naphthalimido) alkyl methacrylates] Polymer Journal vol. 26, No. 4, pp. 397–402 (1994).

Abstract of D.H. Choi et al., *Synth. Met.* 71 (1–3), 1731–2 (1995).

Patent Abstracts of Japan, vol. 12, No. 230 (C–508), Abstract of JP 63023901 (Feb. 1, 1988).

Patent Abstracts of Japan, Abstracts of JP 4300991 (Oct. 23, 1992).

Chem. Abstr. 120:310930u (Jun. 13, 1994).

Appl. Phys. Lett. 57, pp. 531–533 (Aug. 6, 1990).

Orbit Abstract of DE 23 60 705 (Jun. 26, 1975).

Ai et al., CA 111:164206 (1989).

Orbit Abstract of EP 0 686 662 (Dec. 13, 1995).

Derwent Abstract of SU 726,116 (Apr. 7, 1980).

Orbit Abstract of EP 0 728 775 (Aug. 28, 1996).

Bisberg et al., Excimer Emission and Wavelength Control from Light–Emitting Diodes Based on Side–Chain Polymers, Macromolecules, vol. 28, No. 1, pp. 386–389 (Jan. 2, 1995).

(CO)POLYMERS BASED ON VINYL UNITS AND USE THEREOF IN ELECTROLUMINESCENT ARRANGEMENTS

Light-emitting components for electronics and photonics are today mainly developed using inorganic semiconductors, such as gallium arsenide. Punctual display elements may be produced using such substances. Arrangements of a large area are not possible.

In addition to semiconductor light emitting diodes, electroluminescent arrangements based on vapour-deposited low molecular weight compounds are also known (U.S. Pat. No. 4,539,507, U.S. Pat. No. 4,769,262, U.S. Pat. No. 5,077,142, EP-A 406 762). With these materials too, as a consequence of the production process, it is only possible to produce small LEDs. Furthermore, these electroluminescent arrangements have elevated production costs and only a very short service life.

Polymers such as poly(p-phenylenes) and poly(p-phenylene-vinylenes) are described as electroluminescent: *Adv. Mater.* 4 (1992) no. 1; *J. Chem. Soc., Chem. Commun.* 1992, pages 32–34; *Polymer*, 1990, volume 31, 1137; *Physical Review B*, volume 42, no. 18, 11670 or WO 90/13148.

In contrast to the fully conjugated polymers, non fully conjugated poly-condensation products with luminescent structural units are described in electro-luminescent arrangements (*Macromol. Chem. Phys.* 195, 2023–2037 (1994)).

The present invention provides polymers for the production of electroluminescent arrangements, which polymers are based on a well known basic structure, such as polystyrene and polyacrylate with covalently bonded luminophoric units in the side chains. Due to their simple production process and ready processability, such polymers are of technical interest with regard to use as electroluminescent materials. Electroluminescent arrangements containing these (co)polymers, are distinguished by elevated luminosity and a wide range of colour hues. The advantages of the (co)polymers according to the invention are, for example, that 1. luminous intensity may purposefully be modified by varying the concentration of luminophore,
2. colour hues may be adjusted by combining various monomers containing, luminophores,
3. the morphology and electrical properties of the polymer layers may be optimised by incorporating appropriate side-chain units.

The present invention relates to (co)polymers which contain at least one repeat chain unit of the general formula (1) or (2) and optionally repeat units of the general formula (3),

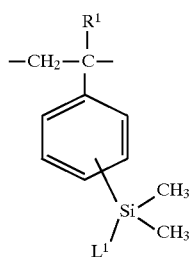
(1)

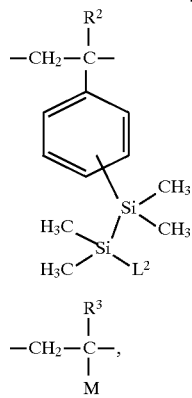
(2)

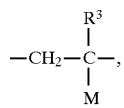
(3)

in which $R^1$, $R^2$ and $R^3$ mutually independently mean hydrogen or $C_1$–$C_6$ alkyl, M denotes CN or $C_1$–$C_{30}$ alkoxycarbonyl, $C_1$–$C_{30}$ (di)alkyl-aminocarbonyl, $C_1$–$C_{30}$ alkylcarbonyl, which may each be substituted by hydroxy or $C_1$–$C_6$ alkoxycarbonyl, and furthermore denotes phenyl, naphthyl, anthracenyl, pyridyl or carbazolyl, which may each be substituted by residues from the group halogen, hydroxy, silyl, $C_1$–$C_{30}$ alkyl, $C_6$–$C_{18}$ aryl, $C_1$–$C_{30}$ alkoxy, $C_1$–$C_{30}$ alkoxycarbonyl, $C_1$–$C_{30}$ acyloxy and $C_1$–$C_{30}$ alkylcarbonyl, $L^1$ and $L^2$ mutually independently mean a photoluminescent residue, wherein the proportion of structural units of the formula (3) is 0 to 99.5, preferably 40 to 99.5 mol. %, and the proportion of structural units of the formula (1) and/or (2) is in each case 0.5 to 100, preferably 0.5 to 60 mol. % and the molar proportions add up to 100%.

In the above-stated formulae, $R^1$, $R^2$ and $R^3$ mutually independently preferably mean hydrogen, methyl or ethyl.

M preferably denotes CN or $C_1$–$C_{15}$ alkoxycarbonyl, $C_1$–$C_{15}$ (di)alkylamino-carbonyl $C_1$–$C_{15}$ alkylcarbonyl, which may each be substituted by hydroxy or methoxycarbonyl, ethoxycarbonyl, n- or iso-propoxycarbonyl, and furthermore denotes phenyl, naphthyl, anthracenyl, pyridyl or carbazolyl, which may each be substituted by residues selected from the group chlorine, bromine, hydroxy, silyl, $C_1$–$C_6$ alkyl, $C_1$–$C_6$ alkoxy, $C_1$–$C_6$ alkoxycarbonyl, $C_1$–$C_6$ acyloxy and $C_1$–$C_6$ alkylcarbonyl, phenyl optionally substituted by methyl, ethyl, n- or iso-propyl.

$L^1$ and $L^2$ mutually independently denote a photoluminescent residue which is based on the skeleton of a fluorescent dye which is selected from the group of coumarins of the formula (4)

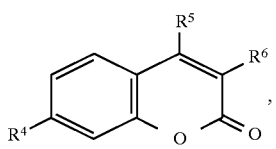
(4)

pyrenes of the formula (5)

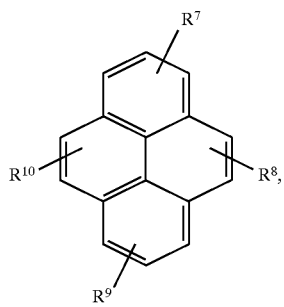

(5)

1,8-naphthalimides of the formula (6)

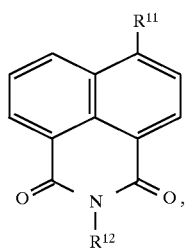

(6)

1,8-naphthaloylene-1',2'-benzimidazoles of the formula (7a) and (7b)

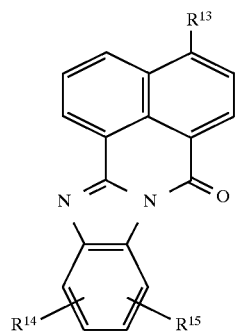

(7a)

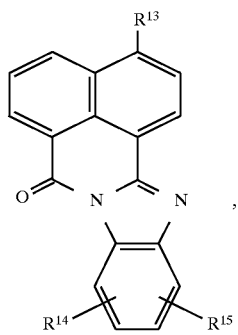

(7b)

phenothiazines or phenoxazines of the formula (8)

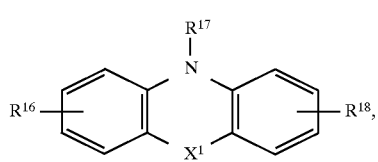

(8)

where $X^1$=O or S, benzopyrones of the formula (9)

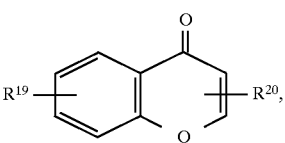

(9)

carbazoles, fluorenes, dibenzothiophenes and -furans of the formula (10)

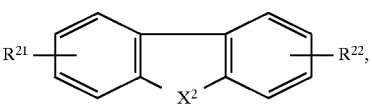

(10)

where $X^2$=$NR^{23}$, $CH_2$, S or O, wherein $R^{23}$ denotes hydrogen or $C_1$–$C_6$ alkyl, preferably hydrogen or $C_1$–$C_4$ alkyl, oxazoles, 1,3,4-oxadiazoles of the formula (11)

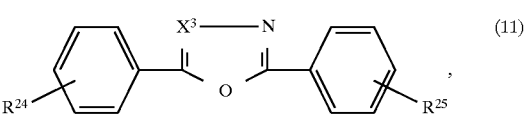

(11)

where $X^3$=CH or N benzoquinolines of the formula (12)

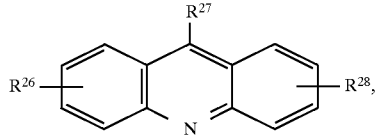

(12)

9,10-bis-(phenylethynyl)anthracenes of the formula (13)

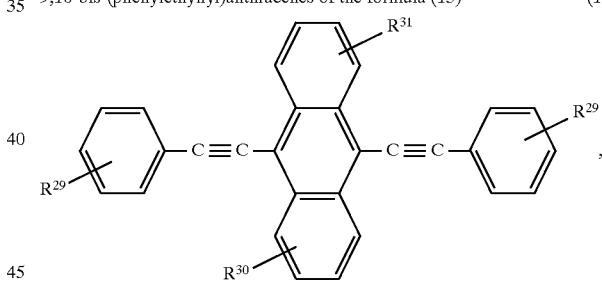

(13)

fluorones of the formula (14)

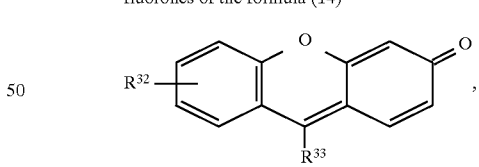

(14)

9,10-diphenylanthracene of the formula (15)

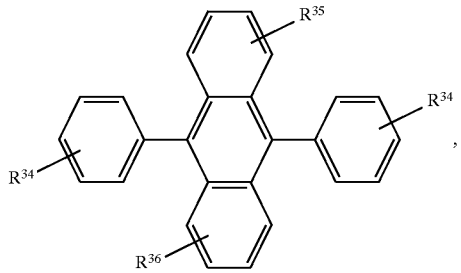

(15)

-continued 2-styrylbenzazole of the formula (16)  (16)

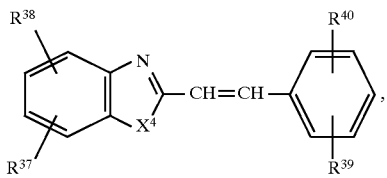

where $X^4$=O, S, Se or $CH_2$,
wherein
$R^4$ denotes hydrogen, $C_1$–$C_{30}$ alkyl, $C_6$–$C_{18}$ aryl, $C_7$–$C_{24}$ aralkyl or $C_1$–$C_{30}$ alkoxy or

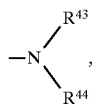

wherein
$R^{43}$ and $R^{44}$ mutually independently denote hydrogen, $C_1$–$C_{30}$ alkyl, $C_6$–$C_{18}$ aryl, $C_7$–$C_{24}$ aralkyl, or,
$R^{43}$ and $R^{44}$, together with the nitrogen atom to which they are attached, may mean a morpholine, piperidine, pyrrolidine or piperazine ring, which may bear one or two substituents from the group methyl, ethyl and phenyl,
$R^5$ denotes hydrogen, cyano, $C_1$–$C_{30}$ alkyl, $C_6$–$C_{18}$ aryl, $C_7$–$C_{34}$ aralkyl, $C_1$–$C_{30}$ alkoxy, $C_2$–$C_{12}$ acyl, $C_1$–$C_{12}$ alkoxycarbonyl, $C_1$–$C_{12}$ (di)alkylaminocarbonyl,
$R^6$ denotes hydrogen, cyano, $C_1$–$C_{30}$ alkyl, $C_6$–$C_{18}$ aryl, $C_7$–$C_{34}$ aralkyl, $C_1$–$C_{30}$ alkoxy or

wherein Z denotes a group $OR^{45}$ or

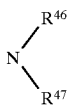

and
$R^{45}$, $R^{46}$ and $R^{47}$ mutually independently denote $C_1$–$C_{30}$ alkyl, $C_6$–$C_{18}$ aryl or $C_7$–$C_{24}$ aralkyl, wherein the aromatic rings may additionally be substituted by halogen, $C_1$–$C_6$ alkyl, $C_1$–$C_6$ alkoxy,
$R^7$, $R^8$ and $R^9$ mutually independently mean hydrogen, $C_1$–$C_{30}$ alkyl, $C_6$–$C_{18}$ aryl, $C_7$–$C_{24}$ aralkyl, $C_1$–$C_{30}$ alkoxy, cyano, $C_2$–$C_{12}$ acyl, $C_1$–$C_{12}$ alkoxycarbonyl, $C_1$–$C_{12}$ (di)alkylaminocarbonyl or an amino group with one or two $C_1$–$C_6$ alkyl groups,
$R^{10}$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, $C_2$–$C_{12}$ acyl, $C_1$–$C_{12}$ alkoxycarbonyl, $C_1$–$C_{12}$ (di)alkylaminocarbonyl,
$R^{11}$ denotes hydrogen, halogen, nitro, $C_1$–$C_4$ alkoxycarbonyl, $C_1$–$C_4$ acyl, $C_8$–$C_{24}$ aralkenyl, unsubstituted amino, or amino identically or differently mono- or disubstituted by $C_1$–$C_{30}$ alkyl, $C_6$–$C_{18}$ aryl or $C_7$–$C_{24}$ aralkyl,
$R^{11}$ furthermore denotes morpholinyl, piperidinyl, pyrrolidinyl or piperazinyl, which may bear one or two substituents selected from methyl, ethyl and/or phenyl,
$R^{12}$ denotes hydrogen, $C_1$–$C_{30}$ alkyl, $C_6$–$C_{18}$ aryl, $C_7$–$C_{24}$ aralkyl or $C_1$–$C_{30}$ alkoxy,
$R^{13}$ denotes hydrogen, $C_1$–$C_{30}$ alkyl, $C_6$–$C_{18}$ aryl, $C_7$–$C_{34}$ aralkyl, $C_1$–$C_{30}$ alkoxy or

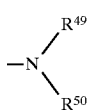

wherein
$R^{49}$ and $R^{50}$ mutually independently denote $C_1$–$C_{30}$ alkyl, $C_6$–$C_{18}$ aryl, $C_7$–$C_{24}$ aralkyl or,
$R^{49}$ and $R^{50}$, together with the nitrogen atom to which they are attached, denote morpholinyl, piperidinyl, pyrrolidinyl or piperazinyl, which may bear one or two identical or different substituents selected from methyl, ethyl and phenyl,
$R^{14}$ and $R^{15}$ mutually independently mean hydrogen, cyano, halogen, nitro, $C_1$–$C_{30}$ alkyl, $C_1$–$C_{30}$ alkoxy, $C_6$–$C_{18}$ aryl or $C_7$–$C_{24}$ aralkyl, $C_1$–$C_{12}$ alkoxycarbonyl, $C_2$–$C_{12}$ acyl, $C_1$–$C_{12}$ (di)alkylaminocarbonyl, $C_1$–$C_6$ (di)alkylamino,
$R^{17}$ and $R^{23}$ mutually independently mean hydrogen, $C_1$–$C_{30}$ alkyl, $C_6$–$C_{18}$ aryl or $C_7$–$C_{24}$ aralkyl and
$R^{16}$, $R^{18}$ to $R^{22}$, $R^{24}$ to $R^{40}$ mutually independently mean hydrogen, cyano, $C_1$–$C_{30}$ alkyl, $C_6$–$C_{18}$ aryl, $C_7$–$C_{24}$ aralkyl, $C_1$–$C_{30}$ alkoxy, an amino group with one or two $C_1$–$C_6$ alkyl groups, unsubstituted amino, $C_2$–$C_{12}$ acyl, $C_1$–$C_{12}$ alkoxycarbonyl or $C_1$–$C_{12}$ (di)alkylaminocarbonyl, wherein the aliphatic carbon chains, such as for example alkyl, alkoxy, alkylamino, aralkyl, in the residues $R^4$ to $R^{13}$, $R^{16}$ to $R^{40}$ may be interrupted by one or more, preferably one or two heteroatoms selected from oxygen, nitrogen and sulphur and/or by one or more, preferably one or two phenylene rings, which may be substituted by $C_1$–$C_4$ alkyl and/or halogen,
and wherein furthermore the luminophore is attached to the polymer side chains via an oxygen of a hydroxy or carboxy group or a nitrogen of an amino or primary amino group on the above-stated substituents.

In the above-stated residues $R^4$ to $R^{40}$, for each fluorescent dye, at least one aliphatic, aromatic or heterocyclic carbon chain bears at least one hydroxy group, by means of which the covalent bond to the monomer is produced by reacting these groups with a reactive group located on the monomer (for example halogen), c.f. production process. In the case of monomer (1), this attachment site is the methylene group on the phenyl ring (—$CH_2$—Cl reacts). In the case of monomer (2), the attachment site is the carbonyl group (via —CO—Cl).

M in particular denotes phenyl, naphthyl, anthracenyl, pyridyl or carbazolyl, which may each be substituted by hydroxy, silyl, $C_1$–$C_4$ alkyl, phenyl optionally substituted by methyl, ethyl, n- or iso-propyl, by $C_1$–$C_4$ alkoxy, $C_1$–$C_6$ alkoxycarbonyl, $C_1$–$C_6$ acyloxy or $C_1$–$C_6$ alkylcarbonyl.

$L^1$ and $L^2$ in particular mutually independently denote a fluorescent dye residue selected from the group of coumarins of the formula (4), pyrenes of the formula (5), 1,8-naphthalimides of the formula (6), 1,8-naphthaloylene-1',2'-benzimidazoles of the formula (7), phenothiazines or phenoxazines of the formula (8), carbazoles and fluorenes of the formula (10).

The present invention also relates to a process for the production of the above-stated (co)polymers which contain at least one repeat chain unit of the general formula (1) or (2) and optionally repeat units of the general formula (3),

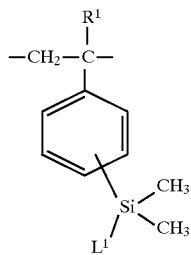 (1)

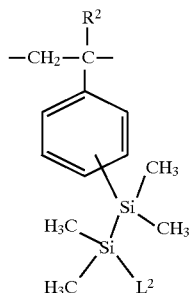 (2)

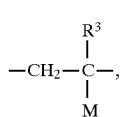 (3)

wherein the residues have the above-stated meanings, wherein the corresponding monomers of the formula (20) or (21)

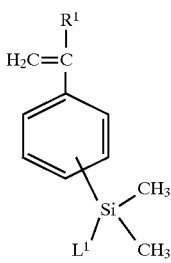 (20)

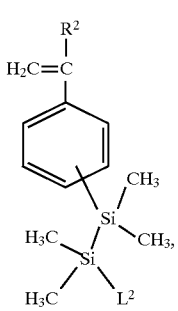 (21)

are produced from a fluorescent dye functionalised with an OH group, which dye contains the structure of L, and from a styrene or acrylic acid derivative of the formula (22) and (23)

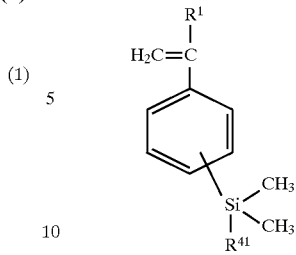 (22)

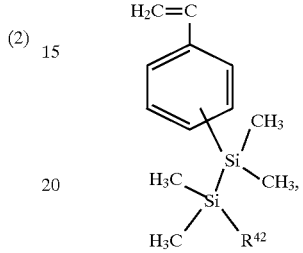 (23)

in which

R$^1$ and R$^2$ have the above-stated meaning and
R$^{41}$ and R$^{42}$ denote a halogen atom, preferably Cl or Br, in the presence of a base, preferably triethylamine, pyridine or an alkali metal alkoxide, and these are then polymerised, optionally in the presence of comonomers of units according to the formula (3).

The reaction with the OH-group functionalised fluorescent dyes generally proceeds at temperatures of −30° C. to 100° C., preferably of 0° C. to 60° C.

The polymerisation processes are described in the literature. They may proceed by ionic or free-radical methods. Anionic polymerisation may, for example, be initiated by initiators such as butyllithium or lithium naphthalide. Free-radical polymerisation may, for example, be initiated by free-radical initiators, such as for example azo initiators or peroxides, preferably AIBN (azoisobutyrodinitrile) or dibenzoyl peroxide. The polymers may be produced by bulk polymerisation or by polymerisation in suitable solvents, such as benzene, toluene, tetrahydrofuran, dioxane, ethyl acetate, xylene, chlorobenzene, 1-methoxy-2-propyl acetate, chlorinated hydrocarbons, acetone, etc. at temperatures of 20°–250° C.

Production of the (co)polymers according to the invention may be represented, for example, by the following reaction scheme:

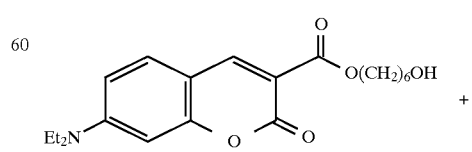

(24)

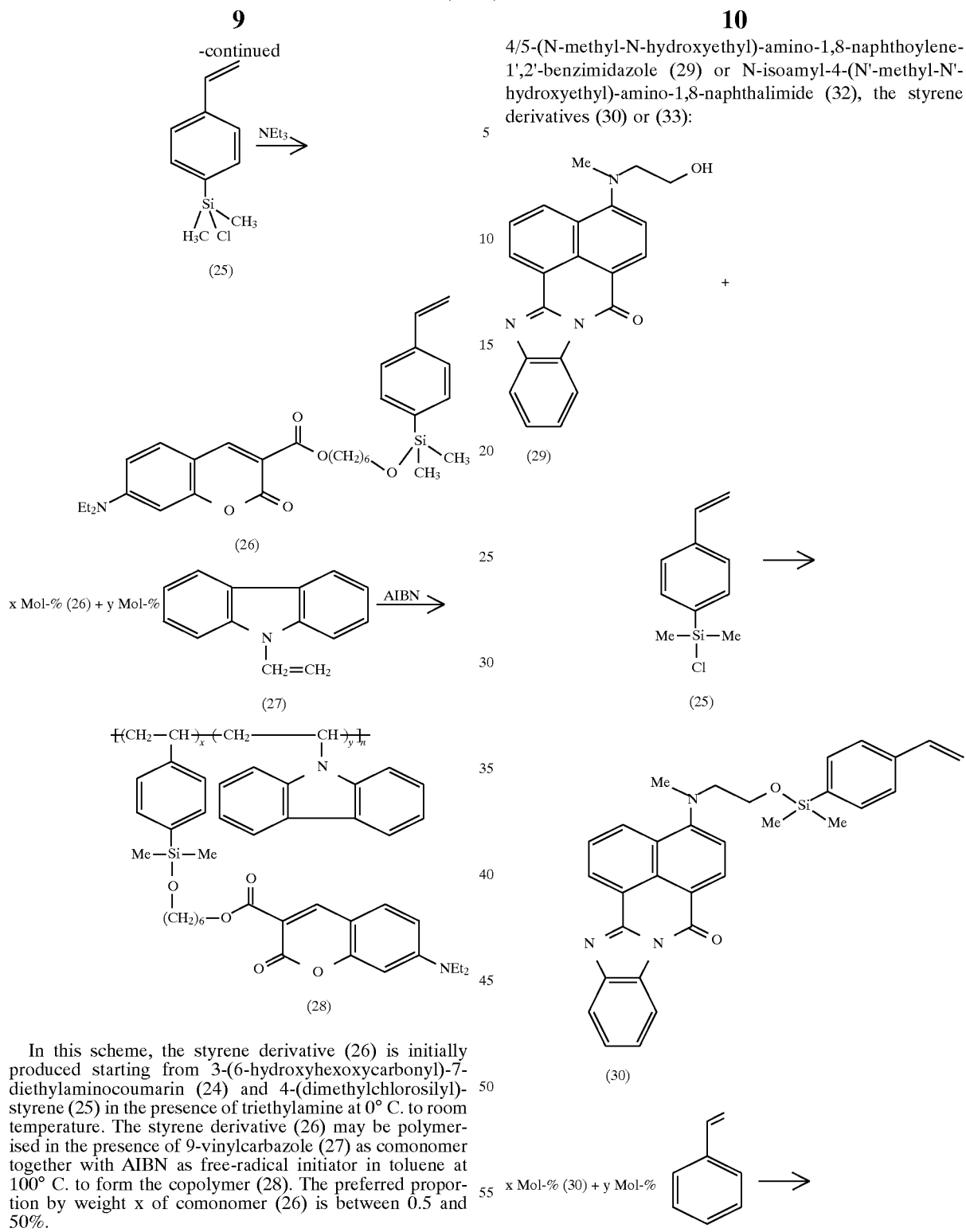

In this scheme, the styrene derivative (26) is initially produced starting from 3-(6-hydroxyhexoxycarbonyl)-7-diethylaminocoumarin (24) and 4-(dimethylchlorosilyl)-styrene (25) in the presence of triethylamine at 0° C. to room temperature. The styrene derivative (26) may be polymerised in the presence of 9-vinylcarbazole (27) as comonomer together with AIBN as free-radical initiator in toluene at 100° C. to form the copolymer (28). The preferred proportion by weight x of comonomer (26) is between 0.5 and 50%.

The polymers (31) or (34) may be produced in a similar manner in the following reaction scheme starting from 4/5-(N-methyl-N-hydroxyethyl)-amino-1,8-naphthoylene-1',2'-benzimidazole (29) or N-isoamyl-4-(N'-methyl-N'-hydroxyethyl)-amino-1,8-naphthalimide (32), the styrene derivatives (30) or (33):

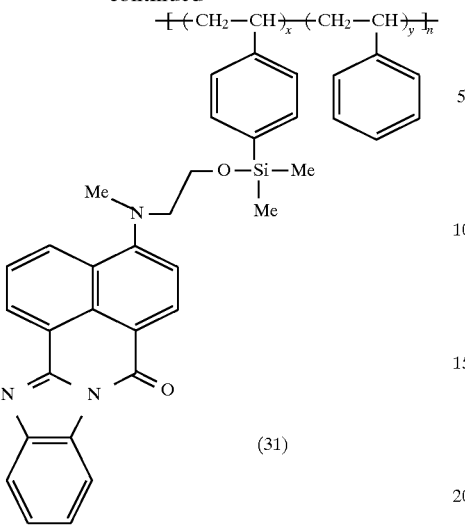

(31)

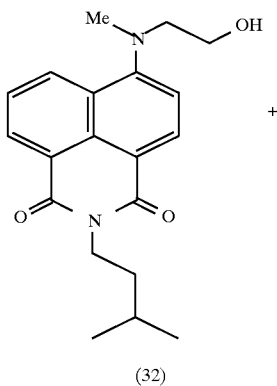

+

(32)

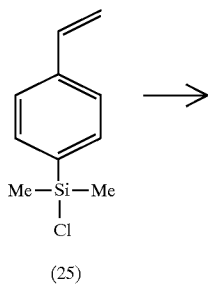

(25)

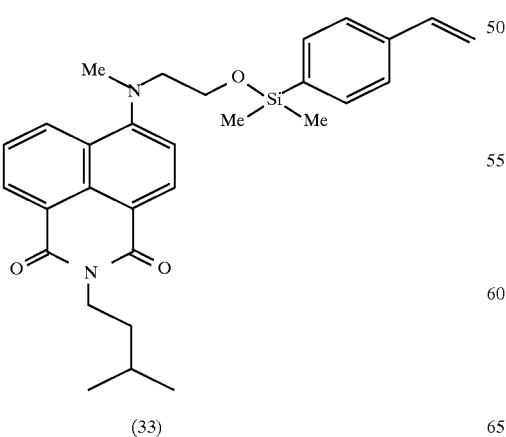

(33)

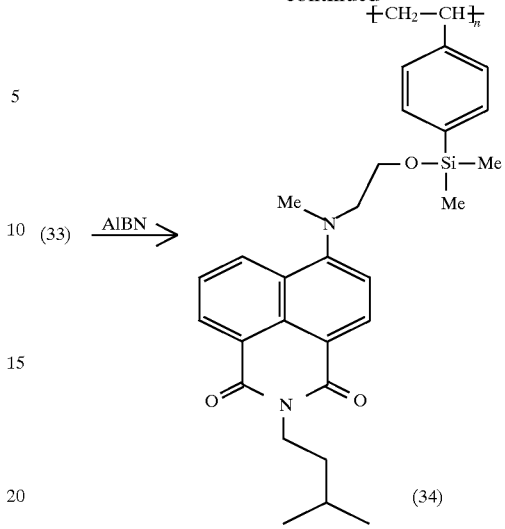

(33) $\xrightarrow{\text{AIBN}}$ (34)

(Co)polymers of the present invention have molecular weights, determined by gel permeation chromatography, in the range from 500 to 1 million g/mol, preferably of 800 to 500,000 g/mol.

Some of the OH-functionalised fluorescent dyes (c.f. definition of residue L) required for the production of the (co)polymers according to the invention are known (A. T. Holohan et al., *Macromol. Chem. Phys.* 195, 2965–2979 (1994)).

The coumarin derivatives of the following formula (4a) are novel and the subject matter of a separate application (DE 1 9505 940.9 of 21.02.95):

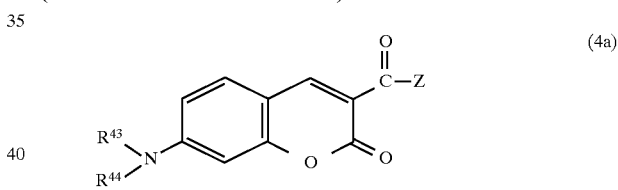

(4a)

wherein $R^{43}$ and $R^{44}$ mutually independently denote hydrogen, $C_1$–$C_{30}$ alkyl, $C_6$–$C_{18}$ aryl, $C_7$–$C_{24}$ aralkyl, which may each be substituted by hydroxy or $C_1$–$C_4$ alkoxycarbonyl or $R^{43}$ and $R^{44}$, together with the nitrogen atom to which they are attached, may mean a morpholine, piperidine, pyrrolidine or piperazine ring, which may bear one or two substituents from the group methyl, ethyl and phenyl, and Z denotes a group $OR^{45}$ or

wherein $R^{45}$ means $C_1$–$C_{30}$ alkyl, $C_6$–$C_{18}$ aryl or $C_7$–$C_{24}$ aralkyl, which are each substituted by at least one hydroxy group, and wherein the aromatic rings may additionally be substituted by halogen, $C_1$–$C_6$ alkyl, $C_1$–$C_6$ alkoxy and $R^{46}$ and $R^{47}$ mutually independently denote $C_1$–$C_{30}$ alkyl, $C_6$–$C_{18}$ aryl or $C_7$–$C_{24}$ aralkyl, each optionally hydroxy-substituted, wherein at least one of the residues $R^{46}$ and $R^{47}$ has a hydroxy group and wherein aromatic rings may additionally be substituted by halogen, $C_1$–$C_6$ alkyl, $C_1$–$C_6$ alkoxy.

The coumarin derivatives of the formula (4a) according to the invention bear at least one hydroxy group, by means of which they may be chemically bonded to the polymer side chains.

In the formula (4a), $R^{43}$ and $R^{44}$ mutually independently preferably denote hydrogen or $C_1$–$C_{16}$ alkyl, optionally substituted by hydroxy and/or $C_1$–$C_4$ alkoxy-carbonyl, or phenyl, naphthyl, phenyl-$C_1$–$C_4$-alkyl or naphthyl-$C_1$–$C_4$-alkyl each unsubstituted or substituted by $C_1$–$C_4$ alkyl, hydroxy, amino, carboxy, $C_1$–$C_4$ alkoxycarbonyl, chlorine and/or bromine.

$R^{43}$ and $R^{44}$ in particular denote $C_1$–$C_6$ alkyl or phenyl optionally substituted by hydroxy, Z in the above-stated formula (4a) denotes $OR^{45}$ or $NR^{46}R^{47}$, wherein $R^{45}$ preferably denotes $C_1$–$C_{16}$ alkyl, phenyl, naphthyl, phenyl-$C_1$–$C_4$-alkyl or naphthyl-$C_1$–$C_4$-alkyl, which are each substituted by at least one hydroxy group, and wherein the aromatic rings may additionally be substituted by halogen, $C_1$–$C_6$ alkyl, $C_1$–$C_6$ alkoxy, $R^{46}$ and $R^{47}$ mutually independently preferably denote $C_1$–$C_{16}$ alkyl, phenyl, naphthyl, phenyl-$C_1$–$C_4$-alkyl or naphthyl-$C_1$–$C_4$-alkyl, each optionally substituted by hydroxy, wherein at least one of the residues $R^4$ and $R^5$ has a hydroxy group and wherein the aromatic rings may additionally also be substituted by halogen, $C_1$–$C_6$ alkyl, $C_1$–$C_6$ alkoxy.

$R^{45}$ particularly preferably denotes a $C_1$–$C_{12}$ alkyl substituted by a hydroxy group.

$R^{46}$ and $R^{47}$ mutually independently particularly preferably denote $C_1$–$C_{12}$ alkyl optionally substituted by a hydroxy group, wherein at least one of the residues $R^4$ and $R^5$ has a hydroxy group.

The novel coumarin derivatives of the formula (4a),

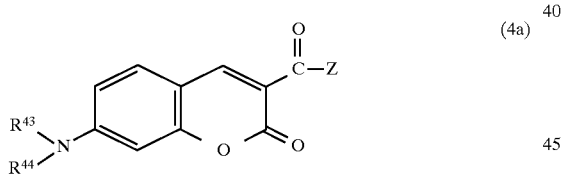

wherein $R^{43}$, $R^{44}$ and Z have the above-stated meaning, may be produced by, a) in the event that Z denotes —$OR^{45}$, producing the malonic acid derivative of the formula (III)

preferably in a single vessel process from the Meldrum's acid of the formula (I)

and an alcohol of the formula (II)

optionally in the presence of a diluent, such as for example toluene, xylene or mesitylene with catalysis by, for example, p-toluenesulphonic acid at temperatures in the range from 20° to 250° C., preferably from 80° to 150° C., and then reacting this malonic acid derivative with a salicylic aldehyde of the formula (IV)

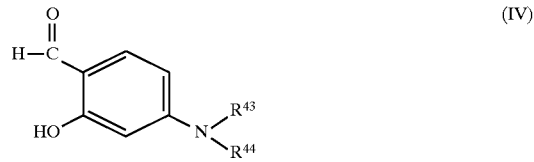

wherein $R^{43}$, $R^{44}$ and $R^{45}$ have the above-stated meaning, optionally in the presence of a diluent, such as for example toluene, xylene, mesitylene, with catalysis by, for example, piperidine acetate at temperatures of 50° to 250° C., preferably of 80° to 140° C., and, b) in the event that Z denotes

by reacting a salicylic aldehyde of the formula (IV), a secondary amine of the formula (V) and a malonic acid derivative of the formula (VI)

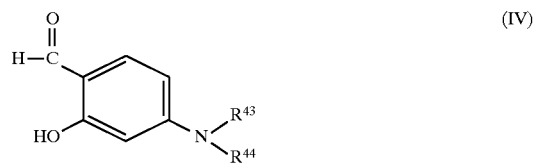

in which $R^{43}$, $R^{44}$, $R^{46}$ and $R^{47}$ have the above-stated meaning and $R^{48}$ denotes $C_1$–$C_6$ alkyl, optionally in the presence of a diluent, such as for example toluene, xylene or mesitylene, with catalysis by, for example, piperidine acetate at temperatures of 50° to 250° C., preferably of 80° to 140° C.

When performing the process a) according to the invention, 2–10 mol, preferably 3–6 mol of alcohol of the formula (II) are generally used for each mol of Meldrum's acid of the formula (I), and 0.5–1.0 mol, preferably 0.9–1.0 mol of salicylic aldehyde of the formula (IV) is generally used per mol of malonic acid derivative of the formula (III).

When performing the process b) according to the invention, 2–20 mol, preferably 5–10 mol of secondary amine and 1–2, preferably 1.2–1.5 mol of malonic acid derivative of the formula (VI) are generally used per mol of salicylic aldehyde of the formula (IV).

Production of the coumarin derivatives of the formula (4a), where Z=$OR^{45}$, by way of a Knoevenagel condensation reaction and subsequent cyclisation is illustrated by way of example by the following reaction scheme:

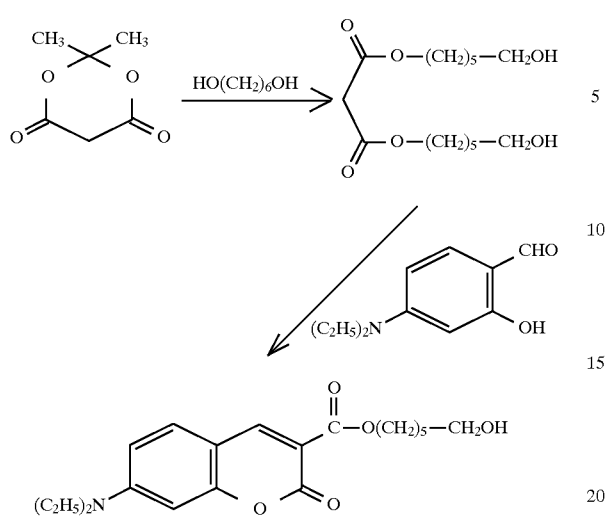

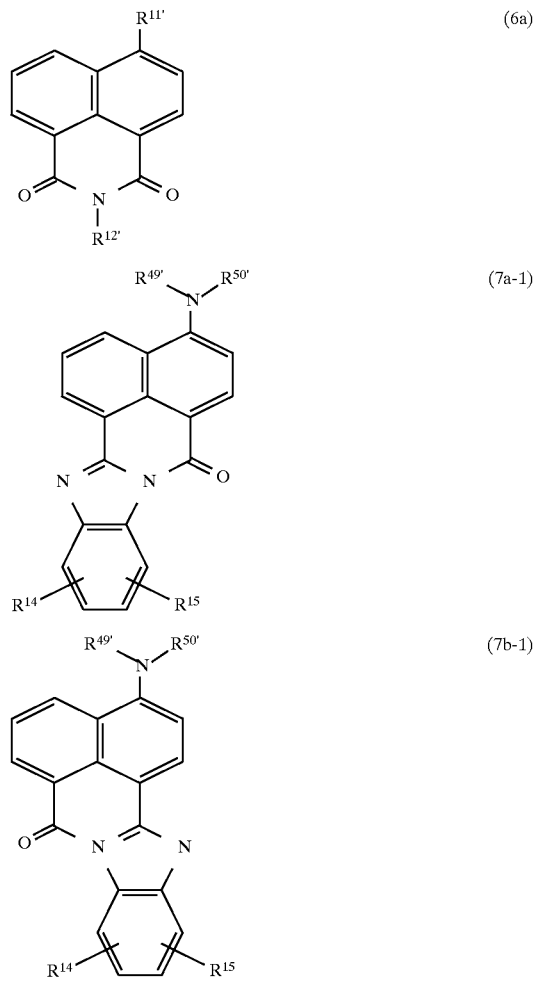

In this scheme, bis-(6-hydroxyhexyl) malonate is first produced by reacting the Meldrum's acid and 1,6-hexanediol in the presence of catalytic quantities of p-toluenesulphonic acid with elimination of acetone and water. The bis-(6-hydroxyhexyl) malonate is then combined with 4-diethylaminosalicylic aldehyde in the presence of catalytic quantities of piperidine acetate to form the desired 3-(6-hydroxyhexoxycarbonyl)-7-diethylaminocoumarin.

Production of the coumarin derivatives of the formula (4a), where $Z=NR^{46}R^{47}$, is illustrated by way of example by the following reaction scheme:

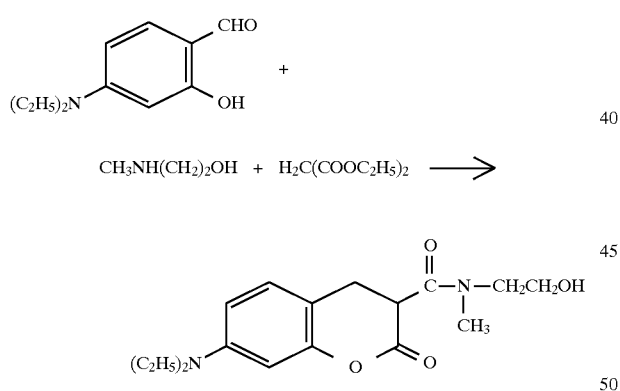

In this scheme, 4-diethylaminosalicylic aldehyde is reacted with diethyl malonate and 2-(methylamino)ethanol in the presence of catalytic quantities of piperidine acetate. The desired 3-[(N-hydroxyethyl-N-methyl)aminocarbonyl]-7-diethylaminocoumarin is obtained.

The starting products of the formulae (I), (II), (III), (IV), (V) and (VI) are compounds which are generally known in organic chemistry.

The following 1,8-naphthalimide derivatives of the formulae (6a), (7a-1) and (7b-1) are also novel and the subject matter of a separate patent application DE 1 9505 941.7 of 21.02.95:

in which $R^{11'}$ denotes hydrogen, halogen, nitro, $C_1-C_4$ alkoxycarbonyl, $C_1-C_4$ acyl, $C_8-C_{24}$ aralkenyl, unsubstituted amino or amino identically or differently mono- or disubstituted by $C_1-C_{30}$ alkyl, $C_6-C_{18}$ aryl, $C_7-C_{24}$ aralkyl, wherein the above-stated carbon chains may themselves be substituted by hydroxy, $R^{11'}$ furthermore denotes morpholinyl, piperidinyl, pyrrolidinyl or piperazinyl, which may bear one or two substituents selected from methyl, ethyl and/or phenyl, $R^{12'}$ denotes hydrogen or $C_1-C_{30}$ alkyl, $C_1-C_{30}$ alkoxy, $C_6-C_{18}$ aryl or $C_7-C_{24}$ aralkyl, which may be mono- or polysubstituted by hydroxy, and at least one of the residues $R^{11'}$ or $R^{12'}$ has a hydroxy group, $R^{49'}$ and $R^{50'}$ mutually independently denote $C_1-C_{30}$ alkyl, $C_6-C_{18}$ aryl, $C_7-C_{24}$ aralkyl, which may be substituted by hydroxy, wherein at least one of the residues $R^{49'}$ or $R^{50'}$ has a hydroxy group.

$R^{49'}$ and $R^{50'}$, together with the nitrogen atom to which they are attached, moreover denote morpholinyl, piperidyl, pyrrolidyl or piperazinyl, which may bear one or two identical or different substituents selected from methyl, ethyl and phenyl, and have at least one hydroxy group, $R^{14}$ and $R^{15}$ mutually independently mean hydrogen, halogen, cyano, halogen, nitro, $C_1-C_{30}$ alkyl, $C_1-C_{30}$ alkoxy, $C_6$–$C_{18}$ aryl, $C_7$–$C_{24}$ aralkyl, $C_1$–$C_{12}$ alkoxycarbonyl, $C_2$–$C_{12}$ acyl or $C_1C_6$ (di)alkylamino.

The 1,8-naphthalimide derivatives of the formulae (6a), (7a-1) and (7b-1) according to the invention bear at least one hydroxy group, by means of which they may be chemically bonded to the polymer side chains.

In the above-stated formula (6a), $R^{11'}$ preferably denotes hydrogen, chlorine, bromine, nitro, methoxycarbonyl, ethoxycarbonyl, n- or iso-propoxycarbonyl, methylcarbonyl, ethylcarbonyl, n- or iso-propylcarbonyl, amino, amino identically or differently mono- or disubstituted by $C_1$–$C_{15}$ alkyl, or phenyl, naphthyl, phenyl-$C_1$–$C_4$-alkyl or naphthyl-$C_1$–$C_4$-alkyl, in each case optionally substituted by methyl and/or ethyl, wherein the above-stated carbon chains may themselves by substituted by hydroxy, $R^{11'}$ furthermore preferably denotes morpholinyl, piperidinyl, pyrrolidinyl or piperazinyl, which may bear one or two substituents selected from hydroxy, methyl, ethyl and/or phenyl.

$R^{12'}$ preferably denotes hydrogen or $C_1$–$C_{15}$ alkyl, phenyl or phenyl-$C_1$–$C_6$-alkyl, which may be substituted by hydroxy and the aromatic rings may additionally also be substituted by halogen, $C_1$–$C_6$ alkyl and/or $C_1$–$C_6$ alkoxy.

$R^{11'}$ in particular denotes chlorine, bromine, amino which is identically or differently mono- or disubstituted by $C_1$–$C_{15}$ alkyl, morpholinyl, piperidinyl, pyrrolidinyl or piperazinyl, wherein the above-stated carbon chains may themselves by substituted by hydroxy.

$R^{12'}$ in particular denotes $C_1$–$C_{12}$ alkyl, phenyl optionally substituted by halogen, $C_1$–$C_6$ alkyl and/or $C_1$–$C_6$ alkoxy, which may bear a hydroxy group.

At least one of the residues $R^{11'}$ and $R^{12'}$ must have a hydroxy group.

$R^{49'}$ and $R^{50'}$ in the formulae (7a-1) and (7b-1) preferably mutually independently preferably denote $C_1$–$C_{15}$ alkyl, phenyl, phenyl-$C_1$–$C_6$-alkyl, naphthyl, naphthyl-$C_1$–$C_6$-alkyl, which may be mono- or poly-, in particular mono-substituted by hydroxy or carboxy, wherein at least one of the residues $R^{49'}$ or $R^{50'}$ has a hydroxy group.

$R^{49'}$ and $R^{50'}$, together with the nitrogen atom to which they are attached, moreover preferably denote piperidinyl or piperazinyl, which may bear one or two identical or different substituents selected from methyl, ethyl and phenyl, and have at least one hydroxy or carboxy group, $R^{14}$ and $R^{15}$ in the formulae (7a-1) and (7b-1) mutually independently preferably denote hydrogen, halogen, $C_1C_{15}$ alkyl, $C_1$–$C_{15}$ alkoxy, $C_1$–$C_4$ alkoxy-carbonyl, $C_1$–$C_4$ acyl or di($C_1$–$C_6$ alkyl)amino, or phenyl, phenyl-$C_1$–$C_6$-alkyl, naphthyl or naphthyl-$C_1$–$C_6$-alkyl in each case substituted by methyl and/or ethyl.

$R^{49'}$ and $R^{50'}$ in particular denote $C_1$–$C_{12}$ alkyl, phenyl, phenyl-$C_1$–$C_6$ alkyl, which may be substituted by a hydroxy group, wherein at least one of the residues $R^{49'}$ and $R^{50'}$ has a hydroxy group.

$R^{14}$ and $R^{15}$ in particular denote hydrogen, halogen, $C_1$–$C_{12}$ alkyl, $C_1$–$C_{12}$ alkoxy, di($C_1$–$C_6$ alkyl)amino, phenyl.

The number of hydroxy groups is at least one, but there may also be up to four hydroxy groups.

The aromatic rings in the above-stated residues may be identically or differently mono- to penta-, preferably mono- to trisubstituted by the stated substituents.

The aliphatic carbon chains, such as for example alkyl, alkoxy, alkylamino, aralkyl, in $R^{43}$, $R^{44}$, $R^{45}$, $R^{46}$ and $R^{47}$, $R^{11'}$, $R^{12'}$, $R^{45'}$, $R^{50'}$ may be interrupted one or more, preferably one or two, heteroatoms selected from oxygen, nitrogen and sulphur and/or by one or more, preferably one or two, phenylene rings, which may be substituted by $C_1$–$C_4$ alkyl and/or halogen.

A process for the production of novel 1,8-naphthalimide derivatives of the formula (6a)

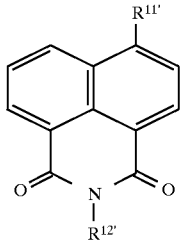

(6a)

in which $R^{11'}$ and $R^{12'}$ have the above-stated meaning, is characterised in that either a) a 1,8-naphthalic anhydride of the formula (VII) and a primary amine of the formula (VIII),

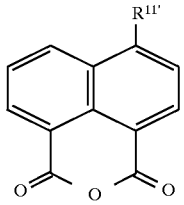

(VII)

$R^{12'}$—$NH_2$          (VIII)

are reacted together at temperatures of 50° to 250° C., preferably of 90° to 140° C., optionally in the presence of diluents, such as for example acetic acid, butanol, chlorobenzene, toluene or xylene or, b) in the event that $R^{11'}$ in formula (6a) means an unsubstituted, mono- or disubstituted amino or cyclic amino, a 1,8-naphthalimide of the formula (6a-1)

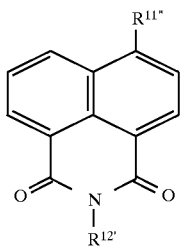

(6a-1)

in which $R^{11''}$ denotes halogen, preferably chlorine, bromine or iodine, or nitro, which is produced from a 1,8-naphthalic anhydride of the formula (VIIa) and a primary amine of the formula (VIII)

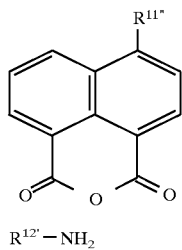 (VIIa)

$R^{12'}-NH_2$ (VIII)

in which $R^{11''}$ and $R^{12'}$ have the above-stated meaning, at temperatures of 50° to 250° C., preferably of 90° to 140° C., optionally in the presence of diluents, such as for example acetic acid, butanol, chlorobenzene, toluene or xylene, and the resultant compound of the formula (6a-1) is then reacted with a primary or secondary amine or piperidine, morpholine, pyrrolidine or piperazine, which may bear one or two substituents selected from methyl, ethyl and/or phenyl, or with an aqueous ammonia solution, optionally in the presence of solvents, such as for example methoxyethanol or butanol, with catalysis by, for example, a copper(II) salt at temperatures of 50° to 250° C., preferably of 100° to 150° C.

A process for the production of novel 1,8-naphthalimide derivatives of the formula (7a-1) and (7b-1) (process C),

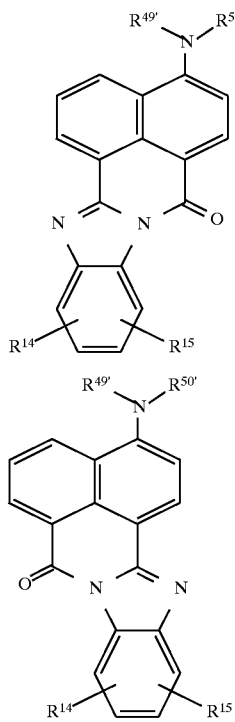

in which, $R^{14}$, $R^{15}$, $R^{49'}$ and $R^{50'}$ have the above-stated meaning, wherein a 1,8-naphthalimide derivative of the formula (IXa and b),

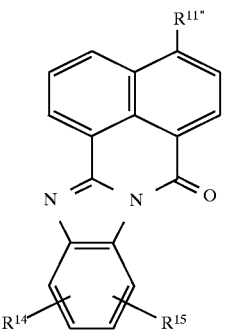 (IXa)

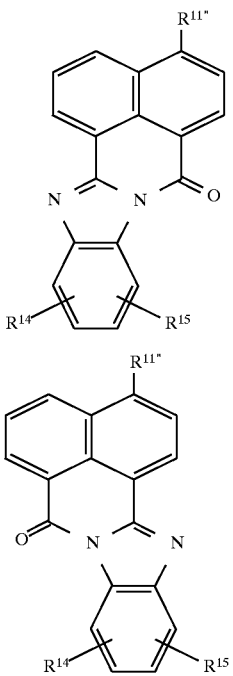 (IXb)

in which $R^{14}$, $R^{15}$ and $R^{11''}$ have the above-stated meaning, is produced from a 1,8-naphthalic anhydride of the formula (VIIa)

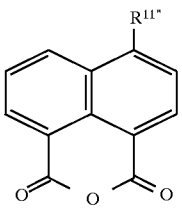 (VIIa)

in which $R^{11''}$ has the above-stated meaning, and an o-phenylenediamine of the formula (X)

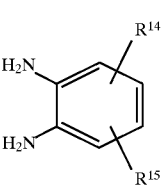 (X)

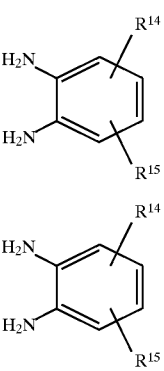 (X)

in which $R^{14}$ and $R^{15}$ have the above-stated meanings, at temperatures of 50° to 250° C., preferably of 90° to 140° C., optionally in the presence of solvents, such as for example acetic acid, butanol, chlorobenzene, toluene or xylene and the 1,8-naphthalimide derivative of the formula (IXa and b) is then reacted with a secondary amine of the formula (XI),

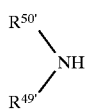
(XI)

in which $R^{49'}$ and $R^{50'}$ have the above-stated meaning, optionally in the presence of a solvent, such as for example methoxyethanol or butanol, with catalysis by, for example, a copper(II) salt at temperatures of 50° to 250° C., preferably of 100° to 150° C.

When performing the process a) according to the invention for the production of the 1,8-naphthalimide derivatives of the formula (6a), 1 to 1.8 mol, preferably 1.2 to 1.4 mol of primary amine of the formula (VIII) are generally used per mol of compound of the formula (VII).

When performing the process b) according to the invention for the production of the 1,8-naphthalimide derivatives of the formula (6a-1), 1 to 1.8 mol, preferably 1.2 to 1.4 mol of the primary amine of the formula (VIII) are generally used per mol of compound of the formula (VIIa) and 1.2 to 5 mol, preferably 2 to 2.5 mol of the corresponding primary, secondary or cyclic amine are used per mol of compound of the formula (6a-1).

Production of the 1,8-naphthalimide derivatives of the formula (6a), processes (a) and (b), according to the invention is illustrated by way of example by the following reaction scheme:

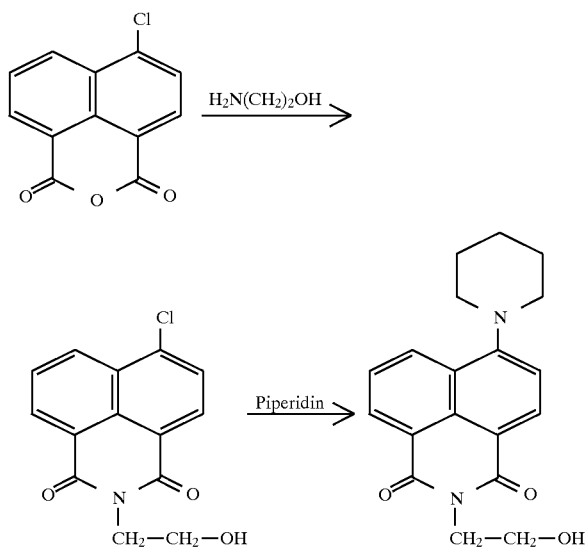

In this scheme, the 4-chloro-N-hydroxyethyl-1,8-naphthalimide is first produced by the reaction of 4-chloronaphthalic anhydride and 2-aminoethanol. The 4-chloro-N-hydroxyethyl-1,8-naphthalimide is then combined with piperidine in the presence of a catalytic quantity of a copper(II) salt to form the desired N-hydroxyethyl-4-piperidino-1,8-naphthalimide.

When performing the process C) according to the invention for the production of the 1,8-naphthalimide derivatives of the formula (7a-1) and (7b-1), 1 to 1.8 mol, preferably 1.2 to 1.4 mol of the o-phenylenediamine of the formula (X) are generally used per mol of compound of the formula (VIIa) and 1.2 to 5 mol, preferably 2 to 2.5 mol of the secondary amine of the formula (XI) are generally used per mol of compound (IXa-b).

Production of the 1,8-naphthalimide derivatives according to the invention of the formulae (7a-1 and 7b-1) is illustrated by way of example by the following reaction scheme:

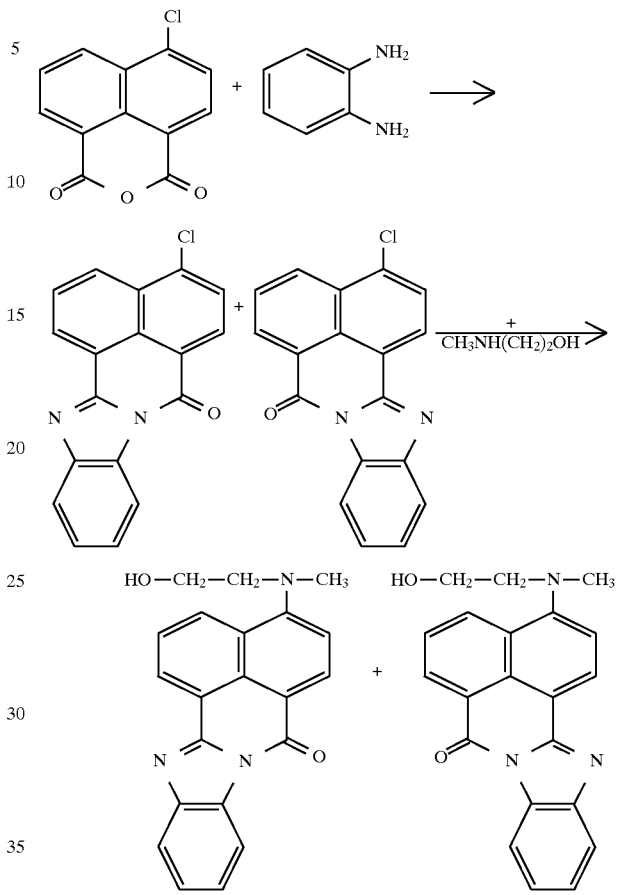

In this scheme, the 4/5-chloro-1,8-naphthoylene-1',2'-benzimidazole, which occurs as an isomeric mixture (approx. 3:1), is first produced by the reaction of 4-chloronaphthalic anhydride and o-phenylenediamine. The 4/5-chloro-1,8-naphthoylene-1',2'-benzimidazole is then combined with 2-(methylamino)ethanol in the presence of a catalytic quantity of a copper(II) salt to form the desired 4/5-(N-methyl-N-hydroxyethyl)amino-1,8-naphthoylene-1', 2'-benzimidazole.

The starting compounds of the formulae (VII), (VIII), (VIIa), (X) and (XI) for the production of the compounds of the formula according to the invention are generally known compounds in organic chemistry.

The styrene and acrylic acid derivatives of the formulae (22) and (23) which are also necessary for the production of the (co)polymers according to the invention are generally known compounds.

The (co)polymers according to the invention are distinguished by their luminescent properties and film-forming capacity and may be applied onto suitable substrates by casting, knife coating or spin coating. The products exhibit photoluminescence on irradiation both in solutions and as films. The (co)polymers of the present invention are suitable for the production of electroluminescent displays.

The invention thus relates to the use of the (co)polymers described above in the luminescent layer of an electroluminescent arrangement, which is characterised in that an electroluminescent layer is located between two electrodes, that at least one of the two electrodes is transparent in the visible range of the spectrum, that light in the frequency range of 200 to 2000 nm is emitted when a direct voltage in the range of 0.1 to 100 volts is applied, that one or more interlayers may additionally be arranged between the electro-luminescent layer and the electrodes.

These interlayers are known from the literature (c.f. *Appl. Phys. Lett.*, 57, 531 (1990)) and are described therein as HTL (hole transport layer) and ETL (electron transport layer). The purpose of such interlayers is inter alia to increase the intensity of electroluminescence.

The electroluminescent polymers according to the invention may, however, also be used in the electroluminescent layer as a mixture with each other or with at least one further material. This further material may be an inert binder, charge transporting substances as described in EP-A 532 798 or EP-A 564 224, mixtures of inert binders and charge transporting substances.

The mixtures of the polymers according to the invention and a further material are distinguished inter alia that they are film-forming and may be applied in large areas onto suitable substrates by casting, knife coating or spin coating. Suitable substrates are transparent supports such as glass or plastic films (for example polyester, such as polyethylene terephthalate or polyethylene naphthalate, polycarbonate, polysulphone, polyimide films).

The inert binder preferably comprises soluble, transparent polymers, such as for example polycarbonates, polystyrene, polyvinylpyridine, polymethylphenylsiloxane and polystyrene copolymers such as SAN, polysulphones, polyacrylates, polyvinylcarbazole, polymers and copolymers of vinyl acetate and vinyl alcohol.

EXAMPLES

Example 1

1. Production of 3-(6-hydroxyhexoxycarbonyl)-7-diethylaminocoumarin, formula (24)

A solution of bis-(6-hydroxyhexyl) malonate in 1,6-hexanediol is prepared on heating a mixture of 21.6 g (0.15 mol) of Meldrum's acid, 59 g (0.50 mol) of 1,6-hexanediol and 0.28 g (1.5 mmol) of p-toluene-sulphonic acid monohydrate for 2 hours at 140° C. The resultant solution is then combined with 26.0 g (0.135 mol) of 4-diethylaminosalicylic aldehyde, 0.7 ml of piperidine and 0.1 ml of acetic acid. The reaction mixture is stirred for 3 hours at 110° C. and, once cool, is combined with 300 ml of water. The suspension is extracted with dichloromethane. The organic phase is evaporated and the residue recrystallised from toluene. 40.2 g (83%) of 3-(6-hydroxyhexoxycarbonyl)-7-diethylaminocoumarin are obtained as yellow crystals with a melting point of 85° to 86° C.

2. Production of 3-[6-(sty-4-ryldimethylsilyloxy)hexoxycarbonyl)]-7-diethyl-aminocoumarin, formula (26)

1.73 g (8.8 mmol) of 4-(chlorodimethylsilyl)styrene (25) are added dropwise with stirring and cooling with iced water to a solution of 2.89 g (8.0 mmol) of 3-(6-hydroxyhexoxycarbonyl)-7-diethylaminocoumarin (24) and 0.93 g (9.2 mmol) of freshly distilled triethylamine in 15 ml of dry methylene chloride. The reaction mixture is stirred for 5 hours at room temperature. The suspension is then suction filtered and the solution evaporated under a vacuum. The crude product is purified by column chromatography (4 g, 96% of theoretical).

3. Production of copolymer (28) in which x=1 mol. %, y=99 mol. %

A solution of 0.10 g (0.19 mol) 3-[6-(sty-4-ryldimethylsilyloxy)hexoxy-carbonyl)]-7-diethylaminocoumarin (26), 3.67 g (0.019 mol) of 9-vinylcarbazole (27) and 30 mg (0.18 mmol) of AIBN in 5 g of dry toluene is degassed and then stirred under nitrogen for 3 hours at 100° C. The polymerisation mixture is then reinitiated with 30 mg of AIBN in three portions within 2 hours. The solution is then added dropwise with stirring to 100 ml of methanol and the suspension is then suction filtered. The crude product is precipitated twice more from a dichloromethane/methanol mixture. 3 g of the desired product is obtained (80% of theoretical).

4. Production of an electroluminescent arrangement

ITO-coated glass (manufactured by Balzers) is cut into substrates of dimensions 20×30 mm and cleaned. Cleaning is performed in the following sequence of stages:

1. 15 minutes' rinsing in distilled water and Falterol in ultrasound bath,
2. 2×15 minutes' rinsing in ultrasound bath, each time with fresh distilled water,
3. 15 minutes' rinsing with ethanol in ultrasound bath,
4. 2×15 minutes' rinsing in ultrasound bath, each time with fresh acetone,
5. drying on lint-free lens cleaning cloths.

A 1% solution of the polymer (28) in 1,2-dichloroethane is filtered (0.2 μm filter, Sartorius). The filtered solution is distributed on the ITO glass with a spin coater at 1000 rpm.

The film produced in this manner is then provided with Al electrodes by vapour deposition. To this end, isolated 3 mm diameter dots of Al are vapour-deposited onto the film using a perforated mask. A pressure of below $10^{-5}$ mbar prevails in the vapour deposition device (Leybold) during deposition.

The ITO layer and the Al electrode are connected to an electrical supply via electrical supply lines. When the voltage is increased, an electric current flows through the arrangement and the described layer electroluminesces in blue. Electroluminescence here occurs irrespective of the polarity of the applied voltage.

Example 2

1. Production of N-isoamyl-4-(N'-methyl-N'-hydroxyethyl)amino-1,8-naphthalimide, formula (32)

A mixture of 46.6 g (0.20 mol) of 4-chloro-1,8-naphthalic anhydride, 21 g (0.24 mol) of isoamylamine and 250 ml of acetic acid is refluxed with stirring for 2 hours. The solution is cooled to room temperature and then combined with 2 l of water. The suspension is filtered and, after drying, 60 g (99% of theoretical) of 4-chloro-N-isoamyl-1,8-naphthalimide are obtained.

A mixture of 30 g (0.10 mol) of 4-chloro-N-isoamyl-1,8-naphthalimide, 22.5 g (0.30 mol) of 2-(methylamino)ethanol, 2.0 g of copper(II) sulphate and 150 ml of ethylene glycol monomethyl ether is refluxed with stirring for 2 hours. Once cool, the solution is largely evaporated and then treated with 150 ml of water. The suspension is extracted with dichloromethane. The organic phase is evaporated and the residue recrystallised from toluene. 24.5 g (71% of theoretical) of N-isoamyl-4-(N'-methyl-N'-hydroxyethyl)amino-1,8-naphthalimide (32) are obtained as brown crystals (melting point 117.0°–117.5° C.).

2. Production of N-isoamyl-4-[N'-methyl-N'-methyl-N'-(2-sty-4-ryldimethylsilyloxyethyl)]amino-1,8-naphthalimide (33)

In a similar manner to the method described in Example 1, point 2, the styrene derivative (33) is obtained at a yield of 94% starting from N-iso-amyl-4-(N'-methyl-N'-hydroxyethyl)amino-1,8-naphthalimide (32) and 4-(chlorodimethylsilyl)styrene (25).

3. Production of the homopolymer, formula (34)

In a similar manner to the method described in Example 1, point 3, 1.55 g (91% of theoretical) of the homopolymer (34) may be produced from 1.71 g (3.4 mmol) of N-isoamyl-4-[N'-methyl-N'-(2-sty-4-ryldimethylsilyloxyethyl)]-amino-1,8-naphthalimide (33) and a total of 24 mg (0.15 mmol) of AIBN with toluene as the solvent.

Example 3

1. Production of 4/5-(N-methyl-N-hydroxyethyl)amino-1,8-naphthoylene-1',2'-benzimidazole of the formula (29)

In a similar manner to the method according to Example 2, point 1,4-chloro-1,8-naphthoylene-1',2'-benzimidazol is obtained from 4-chloro-1,8-naphthalic acid anhydride and o-phenylene diamine at a yield of 87%, and 4/5-(N-methy-N-hydroxyethyl)amino-1,8-naphtoylene-1',2'-benzimidazole (29) from 4-chloro-1,8-naphthaloylene-1',2'-benzimidazol and 2-(methylamino)-ethanol at a yield of 82%.

2. Production of 4/5-[N-methyl-N-(2-sty-4-ryldimethylsilyloxyethyl)amino-1,8-naphthoylene-1',2'-benzimidazole (30)

In a similar manner to the method described in Example 1, point 2, the styrene derivative (30) is obtained at a yield of 83% starting from 4/5-(N-methyl-N-hydroxyethyl)amino-1,8-naphthoylene-1',2'-benzimidazole of the formula (29) and 5-(chlorodimethylsilyl)styrene (25).

3. Production of copolymer (31), in which x=1 mol. %, y=99 mol. %

In a similar manner to the method described in Example 1, point 3, 2.8 g (89% of theoretical) of copolymer (31) may be produced from 0.16 g (0.32 mmol) of 4/5-[N-methyl-N-(2-sty-4-ryldimethylsilyloxyethyl)amino-1,8-naphthoylene-1',2'-benzimidazole (30), 3 g (29 mmol) of styrene and a total of 60 mg (0.36 mmol) of AIBN with toluene as the solvent.

We claim:

1. (Co)polymers which contain at least one repeat chain unit of the general formula (1) or (2) and optionally repeat units of the general formula (3),

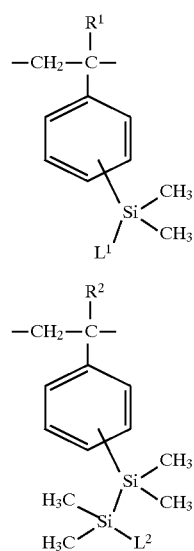

-continued

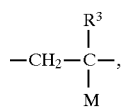

in which

R$^1$, R$^2$ and R$^3$ mutually independently mean hydrogen or C$_1$–C$_6$ alkyl, M denotes CN or C$_1$–C$_{30}$ alkoxycarbonyl, C$_1$–C$_{30}$ (di)alkylaminocarbonyl, C$_1$–C$_{30}$ alkylcarbonyl, which may each be substituted by hydroxy or C$_1$–C$_6$ alkoxycarbonyl, and furthermore denotes phenyl, naphthyl, anthracenyl, pyridyl or carbazolyl, which may each be substituted by residues selected from the group consisting of halogen, hydroxy, silyl, C$_1$–C$_{30}$ alkyl, C$_6$–C$_{18}$ aryl, C$_1$–C$_{30}$ alkoxy, C$_1$–C$_{30}$ alkoxycarbonyl, C$_1$–C$_{30}$ acyloxy and C$_1$–C$_{30}$ alkylcarbonyl, L$^1$ and L$^2$ each denote a photoluminescent residue, wherein the proportion of structural units of the formulae (1) and/or (2) is in each case 0.5 to 100 mol. % and of (3) is 0 to 99.5 mol. % and the molar percentages add up to 100.

2. (Co)polymers according to claim 1, wherein L$^1$ and L$^2$ mutually independently denote a photoluminescent residue which is based on the skeleton of a fluorescent dye which is selected from the group consisting of:

coumarins of the formula (4)

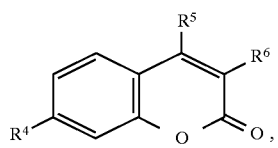

pyrenes of the formula (5)

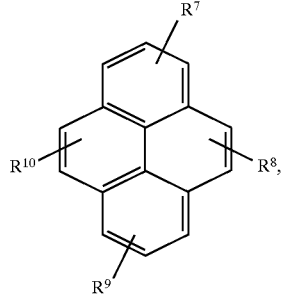

1,8-naphthalimides of the formula (6)

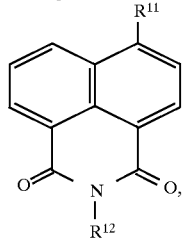

1,8-naphthaloylene-1',2'-benzimidazoles of the formula (7a) and (7b)

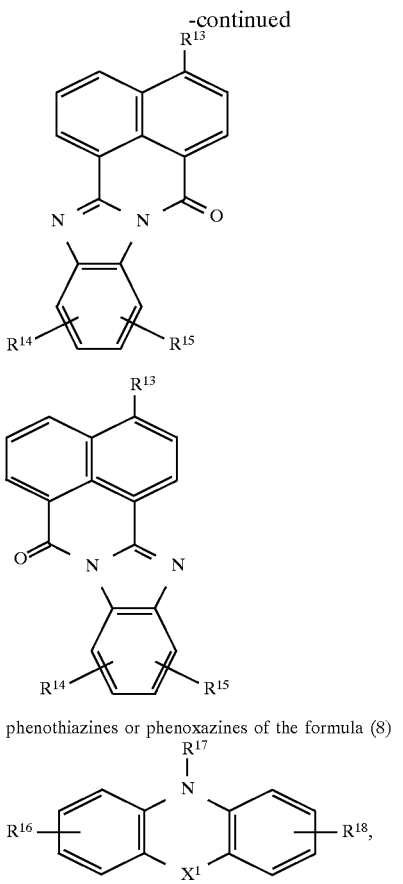

phenothiazines or phenoxazines of the formula (8)

where $X^1$=O or S, benzopyrones of the formula (9)

carbazoles, fluorenes, dibenzothiphenes and -furans of the formula (10)

where $X^2$=NR$^{23}$, CH$_2$, S or O, wherein R$^{23}$ denotes hydrogen or C$_1$–C$_6$ alkyl, oxazoles, or 1, 3, 4-oxadiazoles of the formula (11)

where $X^3$=CH or N benzoquinolines of the formula (12)

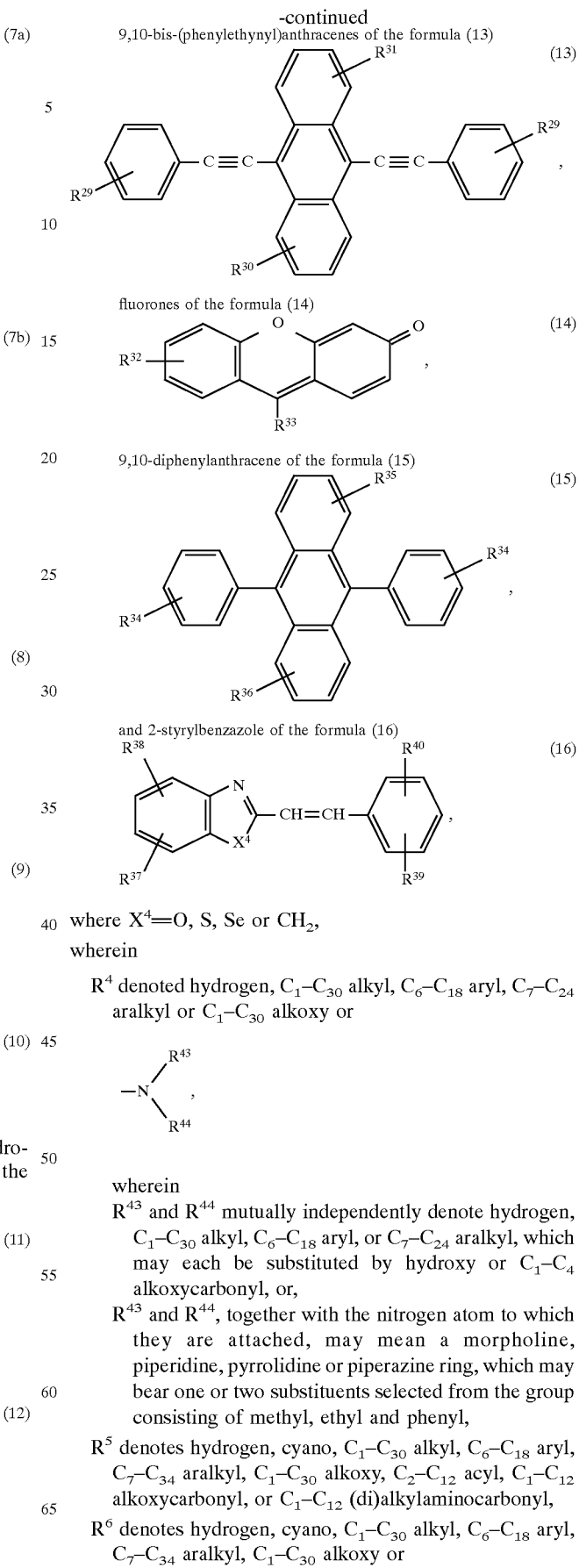

9,10-bis-(phenylethynyl)anthracenes of the formula (13)

fluorones of the formula (14)

9,10-diphenylanthracene of the formula (15)

and 2-styrylbenzazole of the formula (16)

where $X^4$=O, S, Se or CH$_2$, wherein

R$^4$ denoted hydrogen, C$_1$–C$_{30}$ alkyl, C$_6$–C$_{18}$ aryl, C$_7$–C$_{24}$ aralkyl or C$_1$–C$_{30}$ alkoxy or wherein R$^{43}$ and R$^{44}$ mutually independently denote hydrogen, C$_1$–C$_{30}$ alkyl, C$_6$–C$_{18}$ aryl, or C$_7$–C$_{24}$ aralkyl, which may each be substituted by hydroxy or C$_1$–C$_4$ alkoxycarbonyl, or, R$^{43}$ and R$^{44}$, together with the nitrogen atom to which they are attached, may mean a morpholine, piperidine, pyrrolidine or piperazine ring, which may bear one or two substituents selected from the group consisting of methyl, ethyl and phenyl, R$^5$ denotes hydrogen, cyano, C$_1$–C$_{30}$ alkyl, C$_6$–C$_{18}$ aryl, C$_7$–C$_{34}$ aralkyl, C$_1$–C$_{30}$ alkoxy, C$_2$–C$_{12}$ acyl, C$_1$–C$_{12}$ alkoxycarbonyl, or C$_1$–C$_{12}$ (di)alkylaminocarbonyl, R$^6$ denotes hydrogen, cyano, C$_1$–C$_{30}$ alkyl, C$_6$–C$_{18}$ aryl, C$_7$–C$_{34}$ aralkyl, C$_1$–C$_{30}$ alkoxy or

wherein Z denotes a group $OR^{45}$ or

and $R^{45}$, $R^{46}$ and $R^{47}$ mutually independently denote $C_1$–$C_{30}$ alkyl, $C_6$–$C_{18}$ aryl or $C_7$–$C_{24}$ aralkyl, wherein the aromatic rings may additionally be substituted by halogen, $C_1$–$C_6$ alkyl or $C_1$–$C_6$ alkoxy, $R^7$, $R^8$ and $R^9$ mutually independently mean hydrogen, $C_1$–$C_{30}$ alkyl, $C_6$–$C_{18}$ aryl, $C_7$–$C_{24}$ aralkyl, $C_1$–$C_{30}$ alkoxy, cyano, $C_2$–$C_{12}$ acyl, $C_1$–$C_{12}$ alkoxycarbonyl, $C_1$–$C_{12}$ (di)alkylaminocarbonyl or an amino group with one or two $C_1$–$C_6$ alkyl groups, $R^{10}$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, an amino group with one or two $C_1$–$C_6$ alkyl groups, $C_2$–$C_{12}$ acyl, $C_1$–$C_{12}$ alkoxycarbonyl or $C_1$–$C_{12}$ (di)alkylaminocarbonyl, $R^{11}$ denotes hydrogen, halogen, nitro, $C_1$–$C_4$ alkoxycarbonyl, $C_1$–$C_4$ acyl, $C_8$–$C_{24}$ aralkenyl, unsubstituted amino, or amino identically or differently mono- or disubstituted by, $C_1$–$C_{30}$ alkyl, $C_6$–$C_{18}$ aryl or $C_7$–$C_{24}$ aralkyl, $R^{11}$ furthermore denotes morpholinyl, piperidinyl, pyrrolidinyl or piperazinyl, which may bear one or two substituents selected from the group consisting of methyl, ethyl and phenyl, $R^{12}$ denotes hydrogen, $C_1$–$C_{30}$ alkyl, $C_6$–$C_{18}$ aryl, $C_7$–$C_{24}$ aralkyl or $C_1$–$C_{30}$ alkoxy, $R^{13}$ denotes hydrogen, $C_1$–$C_{30}$ alkyl, $C_6$–$C_{18}$ aryl, $C_7$–$C_{34}$ aralkyl, $C_1$–$C_{30}$ alkoxy or

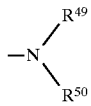

wherein $R^{49}$ and $R^{50}$ mutually independently denote $C_1$–$C_{30}$ alkyl, $C_6$–$C_{18}$ aryl, or $C_7$–$C_{24}$ aralkyl or, $R^{49}$ and $R^{50}$, together with the nitrogen atom to which they are attached, denote morpholinyl, piperidinyl, pyrrolidinyl or piperazinyl, which may bear one or two identical or different substituents selected from the group consisting of methyl, ethyl and phenyl, $R^{14}$ and $R^{15}$ mutually independently mean hydrogen, cyano, halogen, nitro, $C_1$–$C_{30}$ alkyl, $C_1$–$C_{30}$ alkoxy, $C_6$–$C_{18}$ aryl or $C_7$–$C_{24}$ aralkyl, $C_1$–$C_{12}$ alkoxycarbonyl, $C_2$–$C_{12}$ acyl, $C_1$–$C_{12}$ (di)alkylaminocarbonyl, or $C_1$–$C_6$ (di)alkylamino, $R^{17}$ and $R^{23}$ denote hydrogen, $C_1$–$C_{30}$ alkyl, $C_6$–$C_{18}$ aryl or $C_7$–$C_{24}$ aralkyl and $R^{16}$, $R^{18}$ to $R^{22}$, $R^{24}$ to $R^{40}$ mutually independently mean hydrogen, cyano, $C_1$–$C_{30}$ alkyl, $C_6$–$C_{18}$ aryl, $C_7$–$C_{24}$ aralkyl, $C_1$–$C_{30}$ alkoxy, an amino group with one or two $C_1$–$C_6$ alkyl groups, unsubstituted amino, $C_2$–$C_{12}$ acyl, $C_1$–$C_{12}$ alkoxycarbonyl or $C_1$–$C_{12}$ (di)alkylaminocarbonyl, wherein the aliphatic carbon chains in the residues $R^4$ to $R^{13}$, $R^{16}$ to $R^{40}$ may be interrupted by one or more heteroatoms selected from oxygen, nitrogen and sulphur and/or by one or more phenylene rings, which may be substituted by $C_1$–$C_4$ alkyl and/or halogen, and wherein furthermore at least one of the substituents $R^4$ to $R^{40}$, $R^{43}$ to $R^{47}$, $R^{49}$ or $R^{50}$ in each photoluminescent residue bears one or more hydroxy groups and the photoluminescent residue is attached to the polymer side chains via an oxygen atom of one of the one or more hydroxy groups.

3. (Co)polymers according to claim 1, wherein the proportion of the structural units of the formulae (1) and/or (2) is 0.5 to 60 mol. % and optionally that of the formula (3) is 40 to 99.5 mol. %.

4. (Co)polymers according to claim 1, wherein and $L^1$ and $L^2$ mutually independently denote a fluorescent dye residue selected from the group consisting of: coumarins of the formula (4), pyrenes of the formula (5), 1,8-naphthalimides of the formula (6), 1,8-naphthaloylene-1',2'-benzimidazoles of the formula (7), phenothiazines or phenoxazines of the formula (8), and carbazoles and fluorenes of the formula (10).

5. (Co)polymers according to claim 1, wherein said (co)polymers have the following formula (28)

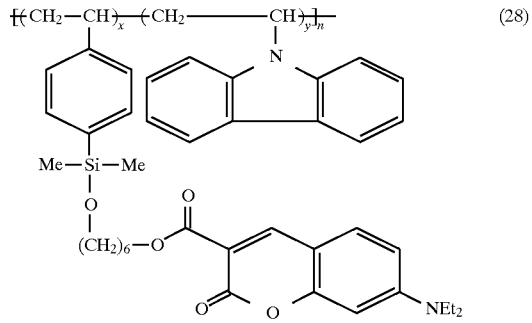

wherein Me=a methyl group and Et=an ethyl group.

6. (Co)polymers according to claim 1, wherein said (co)polymers have the following formula (31)

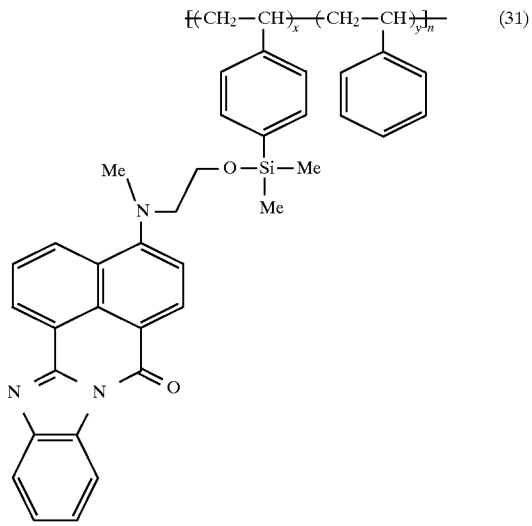

wherein Me=a methyl group.

7. (Co)polymers according to claim 1, wherein said (co)polymers have the following formula (34)

(34)

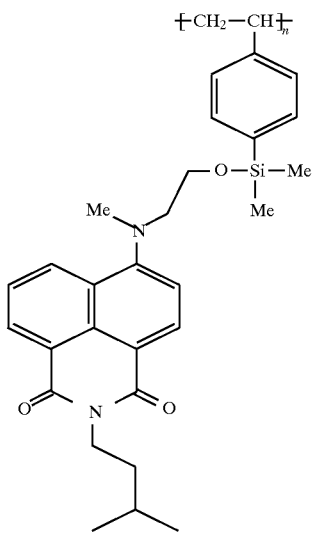

wherein Me=a methyl group.

8. (Co)polymers according to claim 2, in which $L^1$ or $L^2$ is a photoluminescent residue which has the structure

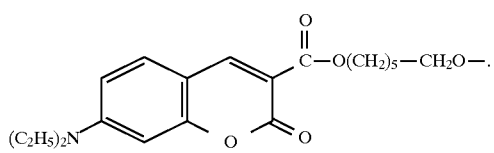

9. (Co)polymers according to claim 2, in which $L^1$ or $L^2$ is a photoluminescent residue which has the structure

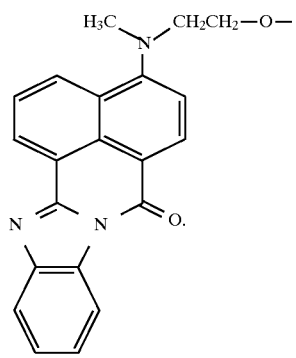

10. (Co)polymers according to claim 2, in which $L^1$ or $L^2$ is a photoluminescent residue which has the structure

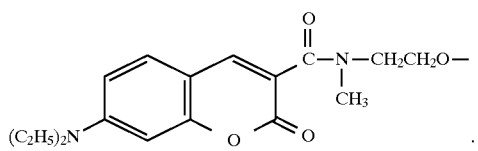

11. (Co)polymers according to claim 2, in which $L^1$ or $L^2$ is a photoluminescent residue which has the structure

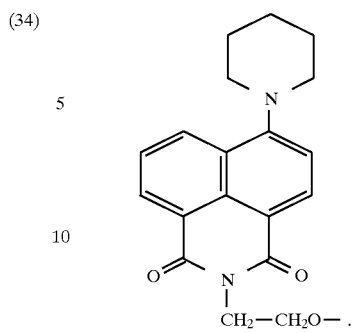

12. (Co)polymers according to claim 2, in which $L^1$ or $L^2$ is a photoluminescent residue which has the structure

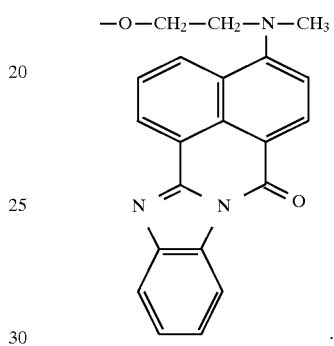

13. (Co)polymers according to claim 2, in which $L^1$ or $L^2$ is a photoluminescent residue which has the structure

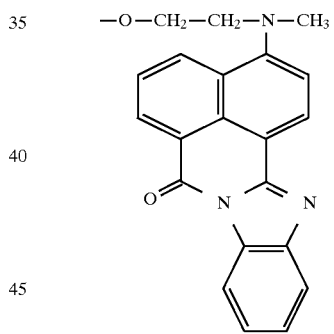

14. (Co)polymers according to claim 2, in which $L^1$ or $L^2$ is a photoluminescent residue which is based on the skeleton of a fluorescent dye having the following formula (4a)

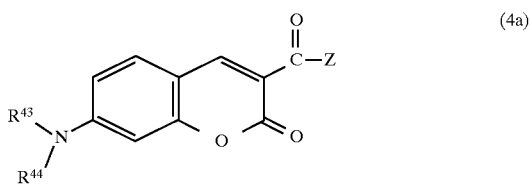

(4a)

wherein $R^{43}$ and $R^{44}$ mutually independently denote hydrogen, $C_1$–$C_{30}$ alkyl, $C_6$–$C_{18}$ aryl or $C_7$–$C_{24}$ aralkyl, which may each be substituted by hydroxy or $C_1$–$C_4$ alkoxycarbonyl or $R^{43}$ and $R^{44}$, together with the nitrogen atom to which they are attached, may mean a morpholine, piperidine, pyrrolidine or piperazine ring, which may bear one or two substituents selected from the group consisting of methyl, ethyl and phenyl, and Z denotes a group $OR^{45}$ or $—NR^{46}R^{47}$, wherein $R^{45}$ means $C_1–C_{30}$ alkyl, $C_6–C_{18}$ aryl or $C_7–C_{24}$ aralkyl, which are each substituted by at least one hydroxy group and wherein the aromatic rings may additionally be substituted by halogen, $C_1–C_6$ alkyl and/or $C_1C_6$ alkoxy and $R^{46}$ and $R^{47}$ mutually independently denote $C_1–C_{30}$ alkyl, $C_6–C_{18}$ aryl, or $C_7–C_{24}$ aralkyl, each optionally hydroxy-substituted, wherein at least one of the residues $R^{46}$ and $R^{47}$ has a hydroxy group and wherein the aromatic rings may additionally be substituted by halogen, $C_1–C_6$ alkyl and/or $C_1–C_6$ alkoxy, further wherein the fluorescent dye of formula (4a) comprises a hydroxy group and the photoluminescent residue is attached to the polymer side chains by the oxygen atom of the hydroxy group.

15. (Co)polymers according to claim 2, in which $L^1$ or $L^2$ is a photoluminescent residue which is based on the skeleton of a fluorescent dye having the following formula (7a-1) or formula (7b-1)

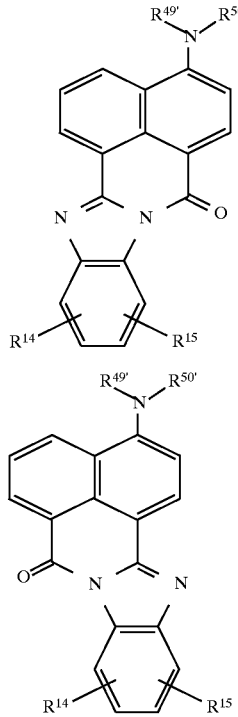

(7a-1)

(7b-1)

wherein $R^{49'}$ and $R^{50'}$ mutually independently denote $C_1–C_{30}$ alkyl, $C_6–C_{18}$ aryl, $C_7–C_{24}$ aralkyl, which may be substituted by hydroxy, or $R^{49'}$ and $R^{50'}$, together with the nitrogen atom to which they are attached, moreover denote morpholinyl, piperidinyl, pyrrolidinyl or piperazinyl, which may bear one or two identical or different substituents selected from the group consisting of methyl, ethyl and phenyl, wherein at least one of the residues $R^{49'}$ and $R^{50'}$ has a hydroxy group, and the photoluminescent residue is attached to the polymer side chains by the oxygen atom of the hydroxy group.

16. (Co)polymers according to claim 2, in which $L^1$ or $L^2$ is a photoluminescent residue which is based on the skeleton of a fluorescent dye having the following formula (6a)

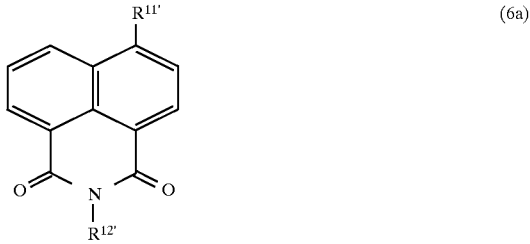

(6a)

in which $R^{11'}$ denotes hydrogen, halogen, nitro, $C_1–C_4$ alkoxycarbonyl, $C_1–C_4$ acyl, $C_8–C_{24}$ aralkenyl, unsubstituted amino or amino identically or differently mono- or disubstituted by $C_1–C_{30}$ alkyl, $C_6–C_{18}$ aryl, $C_7–C_{24}$ aralkyl, wherein the above-stated carbon chains may themselves be substituted by hydroxy, $R^{11'}$ furthermore denotes morpholinyl, piperidinyl, pyrrolidinyl or piperazinyl, which may bear one or two substituents selected from methyl, ethyl and/or phenyl, $R^{12'}$ denotes hydrogen, $C_1–C_{30}$ alkyl, $C_1–C_{30}$ alkoxy, $C_6–C_{18}$ aryl or $C_7–C_{24}$ aralkyl, which may be mono- or polysubstituted by hydroxy, and at least one of the residues $R^{11'}$ or $R^{12'}$ has a hydroxy group.

17. (Co)polymers according to claim 2, wherein $R^{23}$ is hydrogen or $C_1–C_4$ alkyl.

18. (Co)polymers according to claim 2, wherein the aliphatic carbon chains in the residues $R^4$ to $R^{13}$ and $R^{16}$ to $R^{40}$ are alkyl, alkoxy, alkylamino or aralkyl.

19. (Co)polymers according to claim 2, wherein the aliphatic carbon chains in the residues $R^4$ to $R^{13}$ and $R^{16}$ to $R^{40}$ may be interrupted by one or two heteroatoms selected from oxygen, nitrogen and sulphur.

20. (Co)polymers according to claim 2, wherein the aliphatic carbon chains in the residues $R^4$ to $R^{13}$ and $R^{16}$ to $R^{40}$ may be interrupted by one or two phenylene rings.

* * * * *

UNITED STATES PATENT AND TRADEMARK OFFICE
CERTIFICATE OF CORRECTION

PATENT NUMBER: 5,807,945

DATED: September 15, 1998

INVENTOR(S): Chen et al

It is certified that errors appear in the above-identified patent and that said Letters Patent is hereby corrected as shown below:

In column 27, line 43, "dibenzothiphenes" should be changed to - -dibenzothiophenes- -.
In column 28, line 42, "denoted" should be changed to - -denotes- -.
In column 30, line 18, "wherein and" should be changed to - -wherein- -.

Signed and Sealed this

Tenth Day of April, 2001

*Attest:*

NICHOLAS P. GODICI

*Attesting Officer*     Acting Director of the United States Patent and Trademark Office